(12) United States Patent
Allen, Jr. et al.

(10) Patent No.: US 7,954,628 B2
(45) Date of Patent: Jun. 7, 2011

(54) ARTICLE STACKING APPARATUS HAVING AT LEAST ONE SAFETY SENSOR AND METHOD OF OPERATING SAME

(75) Inventors: Clarence Allen, Jr., Mt. Crawford, VA (US); Michael Lippy, Herndon, VA (US); Sharon L. Myers, Wevers Cave, VA (US)

(73) Assignee: A. G. Stacker Inc., Weyers Cave, VA (US)

( * ) Notice: Subject to any disclaimer, the term of this patent is extended or adjusted under 35 U.S.C. 154(b) by 213 days.

(21) Appl. No.: 12/521,830

(22) PCT Filed: Jan. 7, 2008

(86) PCT No.: PCT/US2008/050422
§ 371 (c)(1),
(2), (4) Date: Jun. 30, 2009

(87) PCT Pub. No.: WO2008/086300
PCT Pub. Date: Jul. 17, 2008

(65) Prior Publication Data
US 2010/0049359 A1 Feb. 25, 2010

Related U.S. Application Data

(60) Provisional application No. 60/883,680, filed on Jan. 5, 2007.

(51) Int. Cl.
*B65G 21/00* (2006.01)
(52) U.S. Cl. ...... 198/592; 198/801; 414/790; 414/794.5
(58) Field of Classification Search .................. 198/592, 198/801, 809, 571; 271/162, 201; 414/790, 414/793.8, 794.5, 794.6
See application file for complete search history.

(56) References Cited

U.S. PATENT DOCUMENTS

| 3,321,202 | A | | 5/1967 | Martin | |
|---|---|---|---|---|---|
| 3,798,672 | A | | 3/1974 | Gregg | |
| 5,190,281 | A | | 3/1993 | Cardenas | |
| 5,439,209 | A | * | 8/1995 | Runzi | 271/201 |
| 5,641,052 | A | | 6/1997 | Lazzarotti | |
| 5,697,753 | A | * | 12/1997 | Aurora et al. | 414/794.5 |
| 6,234,473 | B1 | * | 5/2001 | Morgan et al. | 271/201 |
| 6,402,455 | B1 | * | 6/2002 | Vincent et al. | 414/789.5 |
| 6,427,999 | B1 | * | 8/2002 | Christofferson | 271/201 |
| 6,986,635 | B2 | * | 1/2006 | Talken et al. | 198/592 |
| 7,104,747 | B2 | * | 9/2006 | Talken et al. | 414/790 |

* cited by examiner

*Primary Examiner* — James R Bidwell
(74) *Attorney, Agent, or Firm* — Muncy, Geissler, Olds & Lowe, PLLC

(57) ABSTRACT

A stacking apparatus includes a base, a main conveyor pivotably supported on the base that is pivotable between a first, lowered, position and a second, raised, position, an accumulator section downstream of a discharge end of the main conveyor for receiving articles from the main conveyor, where the accumulator section includes a support for supporting a stack of items fed to the accumulator section by the main conveyor. Also, at least one optical sensor detecting the presence of an object in the main conveyor travel path and at least one controller operatively connected to the main conveyor and the optical sensor, the at least one controller receiving signals from the optical sensor and controlling the main conveyor based on the signals and on the direction of movement of the main conveyor.

20 Claims, 7 Drawing Sheets

ARTICLE STACKING APPARATUS HAVING AT LEAST ONE SAFETY SENSOR AND METHOD OF OPERATING SAME

This non-provisional application claims the benefit of U.S. Provisional application No. 60/883,680, filed on Jan. 5, 2007, the entire contents of which are hereby incorporated by reference.

BACKGROUND OF THE INVENTION

1. Field of the Invention

The present invention relates to an apparatus for stacking generally planar articles of material. More specifically, the present invention relates to an apparatus for stacking generally planar articles of material that includes at least one safety sensor and a safety controller for reducing the risk of injury to persons near the apparatus.

2. Description of the Related Art

Devices for stacking generally planar articles of material, such as sheets of corrugated material, are well known. One example of a commercially available device is the AGS2000 Rotary Die Cut Stacker made by the assignee of the present invention, A.G. Machine, Inc., Weyers Cave, Va. Further examples of such devices are disclosed in U.S. Pat. Nos. 3,321,202 to Geo. M. Martin and 3,419,266 to Geo. M. Martin, each of which is expressly incorporated herein by reference in its entirety.

FIGS. 1 and 2 illustrate a conventional apparatus for stacking corrugated blanks. The stacking machine 100 generally comprises a layboy section 102 which receives conjugated blanks, such as those produced by a rotary die cut machine (not illustrated), and discharges the corrugated blanks onto a transfer conveyor 104. The transfer conveyor 104 receives the blanks and transports them to a main conveyor 106. The main conveyor 106 has an intake end 108 and a discharge end 110. At intake end 108, the main conveyor 106 is mounted to a base 112 at a pivot point 114 so that the conveyor may be pivoted to raise the discharge end 110 of the conveyor 106. At the discharge end 110 of the conveyor 106, an accumulator section 116 receives discharged blanks.

In operation, the main conveyor 106 is pivoted about the pivot points to lower the discharge end 110 of the conveyor to an initial position. Sheets are fed onto the main conveyor 106 at its intake end 108, transported along the distance of the conveyor to its discharge end 110, and discharged from the conveyor over an accumulator faceplate 121 having a lower end 123. The sheets are discharged and often strike a backstop 118, having a lower end 119, in the accumulator section 116 which stops the forward momentum of the sheets. The stopped sheets settle down, typically onto a discharge conveyor 132, to form a stack of sheets. As additional sheets are placed on the stack, the main conveyor 106 is pivoted to raise the discharge end 110 vertically so that the discharged sheets are discharged above the top of the growing stack.

Once a stack of sheets is completed, it must be removed to allow additional stacks of articles to be formed on the discharge conveyor. To allow the stack to be removed without stopping the main conveyor 106, catcher elements 120 in accumulator section 116 are extended beyond and below the discharge end 110 of the main conveyor 106 so that sheets leaving the discharge end 110 of the main conveyor 106 fall onto the catcher elements 120. A small pile of sheets is formed on the catcher elements 120 while the stack on the discharge conveyor 132 is removed, and when the stack is clear of the accumulator section 116, main conveyor 106 is lowered, and the catcher elements 120 are withdrawn to deposit the pile of sheets from the catcher elements 120 onto the discharge conveyor 132 to form the beginning of a new stack of sheets onto which additional sheets from the discharge end of the main conveyor 106 are deposited.

The main conveyor 106 is massive, moves relatively quickly from a raised to a lowered position, and can maim or kill a person who is present therebeneath when lowered. Of particular concern are the pinch point formed between the bottom 119 of the accumulator backstop 118 and the discharge conveyor 132 and the pinch point formed between the bottom 123 of the accumulator front plate 121 and the discharge conveyor 132. Either of the pinch points could crush an object, including a user or user's body part, that is in the pinch point when the main conveyor descends. A person standing beneath the main conveyor 106, upstream of the accumulator faceplate 121, for example, could also be severely injured when the main conveyor 106 descends.

Previous attempts to protect machine operators have often focused on perimeter protection, as disclosed, for example in U.S. Pat. No. 6,986,635 and U.S. Pat. No. 7,104,747, both issued to Talken et al. Such systems use a light curtain or one or more beams of light that are broken when a user approaches a dangerous area. However, when the light curtain is too close to an operating piece of machinery, it may not be possible to stop the machine in time to avoid user injury. When the light curtain is too far away from the operating machinery, however, it may frequently be tripped by accident and cause unnecessary shut downs of the machine being protected. Light curtains also do not address the scenario of a person being present between the light curtain and the area of danger when another operator resets the safety system leaving that person exposed to possible injury when the machine resumes operation.

It would therefore be beneficial to provide an article stacking apparatus that is configured to reduce or eliminate human injuries.

SUMMARY OF THE INVENTION

These and other difficulties are addressed by the present invention, a first aspect of which comprises a stacking apparatus for moving items from an upstream location to a downstream location. The stacking apparatus includes a base and a main conveyor pivotably supported on the base with an intake end and a discharge end and that is pivotable between a first, lowered, position and a second, raised, position. These first and second positions define first and second ends of a main conveyor travel path. The stacking apparatus also includes an accumulator section downstream of the main conveyor discharge end for receiving items from the main conveyor, and the accumulator section includes a support for supporting a stack of items fed to the accumulator section by the main conveyor. The stacking apparatus further includes at least one optical sensor detecting the presence of an object in the main conveyor travel path and at least one controller operatively connected to the main conveyor and the optical sensor. The at least one controller receives signals from the optical sensor and controls the main conveyor based on the signals and on the direction of movement of the main conveyor.

Another aspect of the invention comprises a method of operating a stacking apparatus that includes a base and a main conveyor pivotably supported on the base that has an intake end and a discharge end. The main conveyor discharge end is pivotable between a first, lowered, position and a second, raised, position, where the first and second positions define first and second ends of a main conveyor travel path. The method includes steps of providing at least one optical sensor detecting the presence of an object a first zone in and within a first distance of the main conveyor travel path and a second zone outside the first zone, allowing movement of the main conveyor between the lowered position and the raised position when the optical sensor detects an object in the first zone, and stopping the movement of the main conveyor between the raised position and the lowered position when the optical sensor detects an object in the first zone.

A further aspect of the invention comprises a rotary die cut stacker that includes a base, a layboy receiving die cut blanks from a rotary die cutter, and a main conveyor pivotably supported on the base and having an intake end and a discharge end, the main conveyor discharge end being pivotable between a first, lowered, position and a second, raised, position, which first and second positions define first and second ends of a main conveyor travel path. The rotary die cut stacker further includes an accumulator section downstream of the main conveyor discharge end for receiving items from the main conveyor, and the accumulator section includes a support for supporting a stack of items fed to the accumulator section by the main conveyor. The rotary die cut stacker also includes at least one optical sensor detecting the presence of an object in the main conveyor travel path, and at least one controller operatively connected to the main conveyor and the optical sensor. The at least one controller receives signals from the optical sensor and controls the main conveyor based on the signals and on the direction of movement of the main conveyor.

Still another aspect of the present invention comprises a safety system for a stacking apparatus that moves items from an upstream location to a downstream location. The safety system includes at least one optical sensor detecting the presence of an object in a main conveyor travel path, and the main conveyor is pivotably supported on a base and has an intake end and a discharge end. The main conveyor discharge end is pivotable between a first, lowered, position and a second, raised, position, which first and second positions define first and second ends of a main conveyor travel path. The system also includes at least one controller operatively connected to the main conveyor and the optical sensor, the at least one controller receiving signals from the optical sensor and controlling the main conveyor based on the signals and based on a direction of movement of the main conveyor.

BRIEF DESCRIPTION OF THE DRAWINGS

The above and other aspects of exemplary embodiments of the present invention will be more apparent from the following description taken in conjunction with the accompanying drawings, in which.

DETAILED DESCRIPTION

The matters defined in the description such as a detailed construction and elements are provided to assist in a comprehensive understanding of the embodiments of the invention and are merely exemplary. Accordingly, those of ordinary skill in the art will recognize that various changes to and modifications of the embodiments described herein can be made without departing from the scope and spirit of the invention. Also, descriptions of well-known functions and constructions are omitted for clarity and conciseness.

Figures 1, 2:
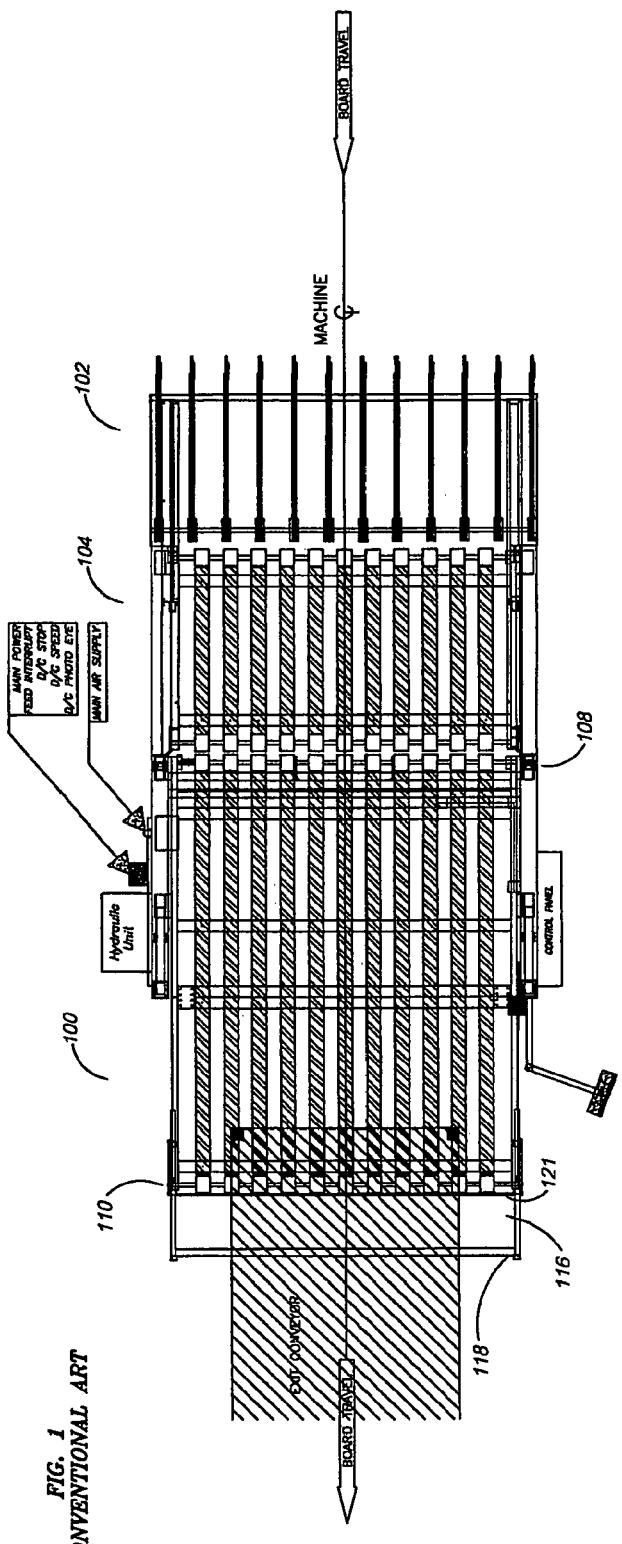
FIG. 1 is a top plan view of a conventional apparatus for stacking generally planar articles such as corrugated blanks.
FIG. 2 is a side elevational view of the apparatus of FIG. 1.
Figure 3:
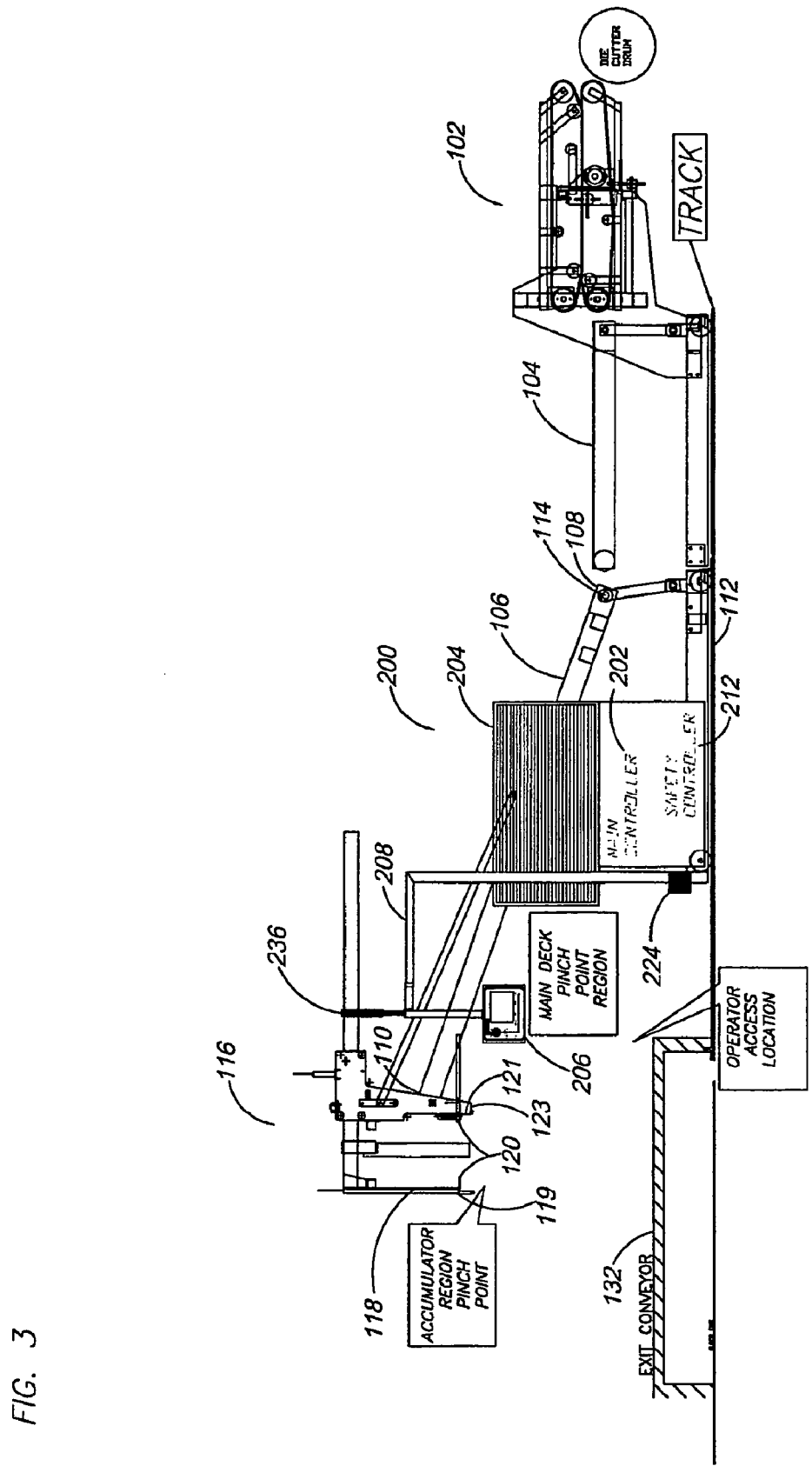
FIG. 3 is a side elevational view of an apparatus for stacking generally planar articles of material according to an embodiment of the present invention with a main conveyor in a raised position.

Referring now to the drawings, wherein the showings are for the purpose of illustrating preferred embodiments of the invention only and not for the purpose of limiting same, FIG. 3 illustrates a stacking apparatus 200 for stacking generally planar articles of material, such as die-cut blanks formed by a rotary die-cutting machine. One use of the present invention is the stacking of die cut corrugated blanks of cardboard material, and the material being processed may be described herein as sheets or boards or blanks. The same reference numerals will be used to identify elements of stacking apparatus 200 that are common to the conventional apparatus 100 illustrated in FIGS. 1 and 2.

Figure 4:
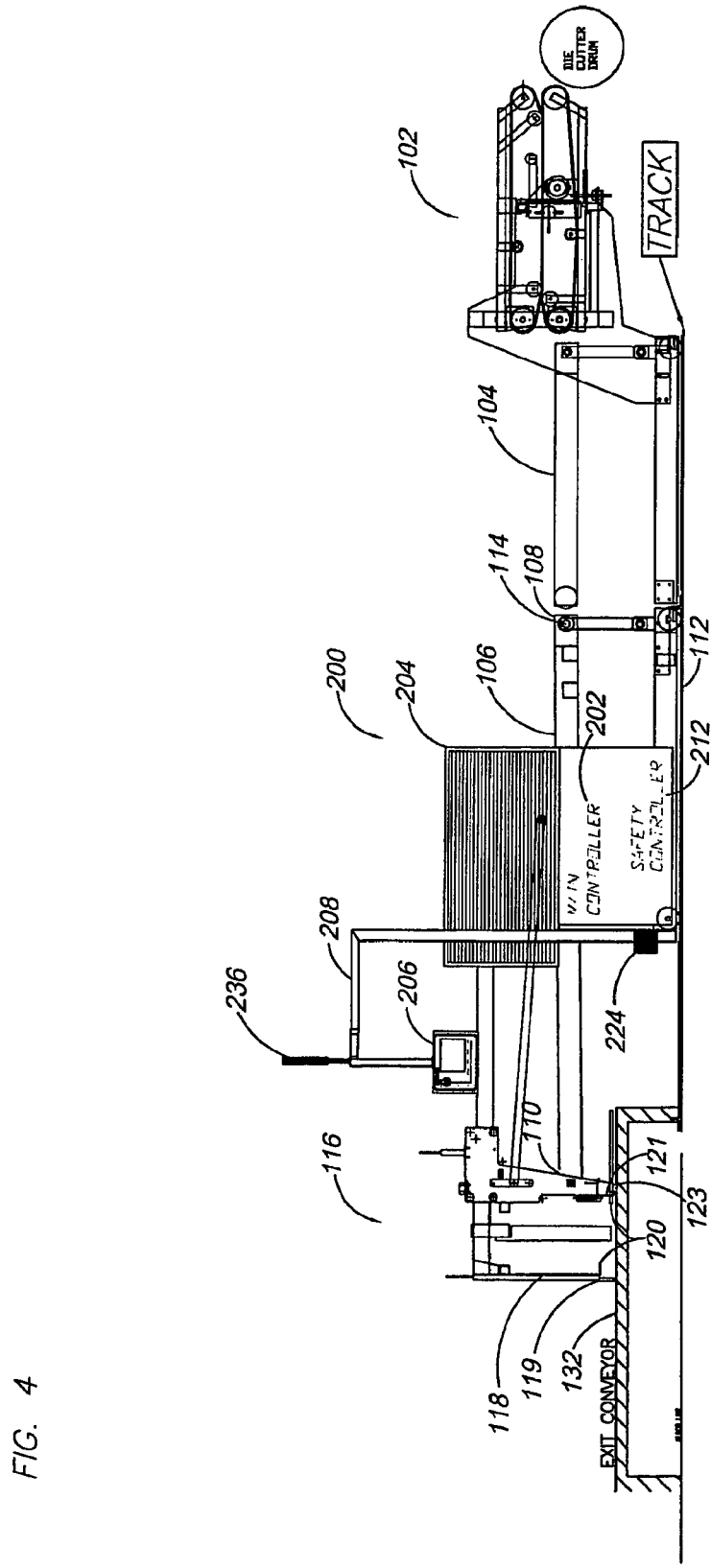
FIG. 4 is a side elevational view of the apparatus of FIG. 3 with the main conveyor in a lowered position.

With reference to FIGS. 3 and 4, operation stacking apparatus 200 is controlled by a main controller 202 housed in control panel 204. Touch screen 206 forms an interface for controller 202 and is mounted on a pivotable pendant arm 208 so that an operator 210 can control the stacking apparatus from a location away from the moving parts of the machine. Also mounted in control panel 204 is a safety controller 212 for controlling various safety sensors described hereinafter. A suitable safety controller is available from SICK, Inc. of Minneapolis, Minn. under the model designation UE410 Flexi.

Figure 5:
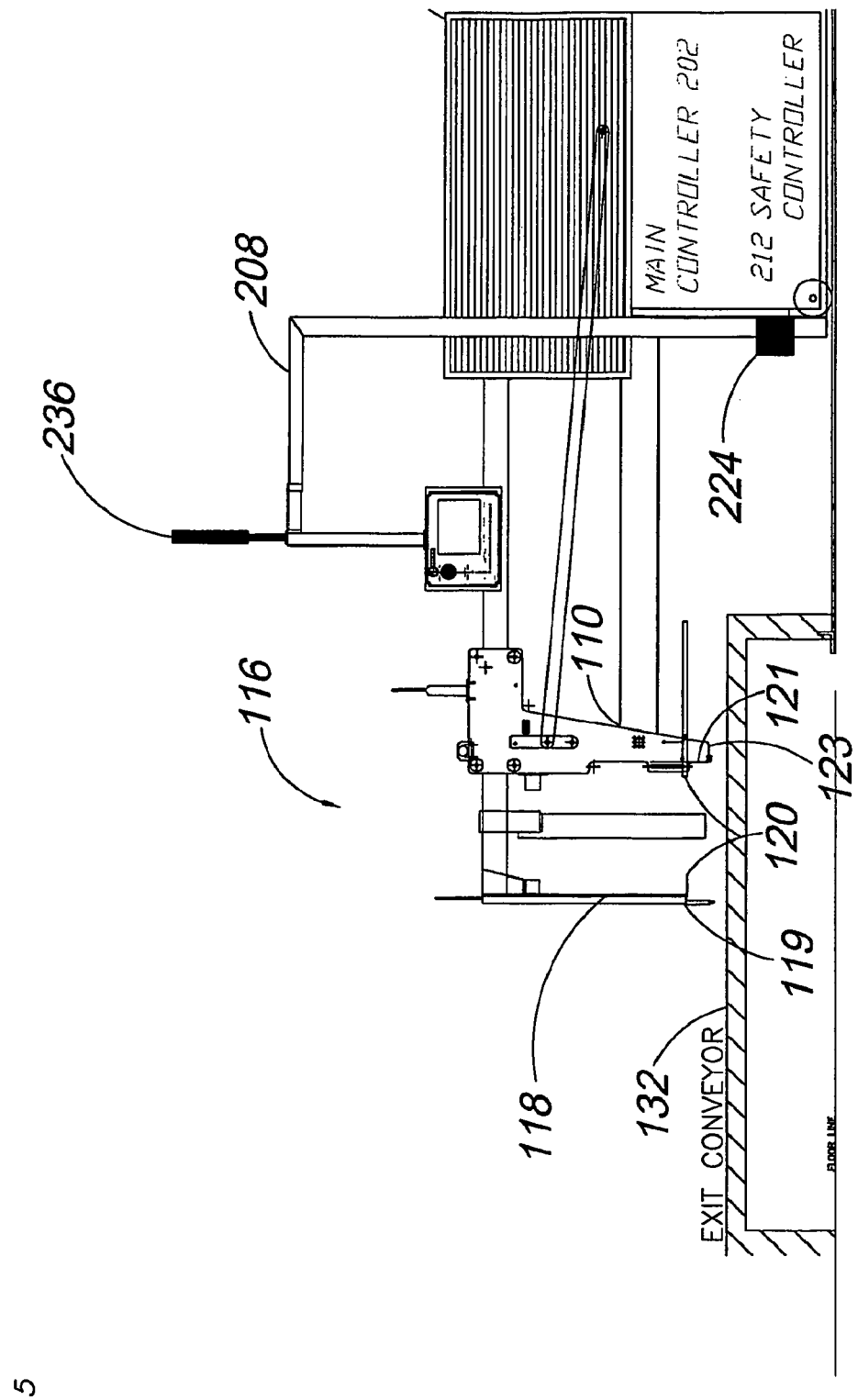
FIG. 5 is a side elevational detail view of a discharge end of the main conveyor of the apparatus of FIG. 3.
Figure 6:
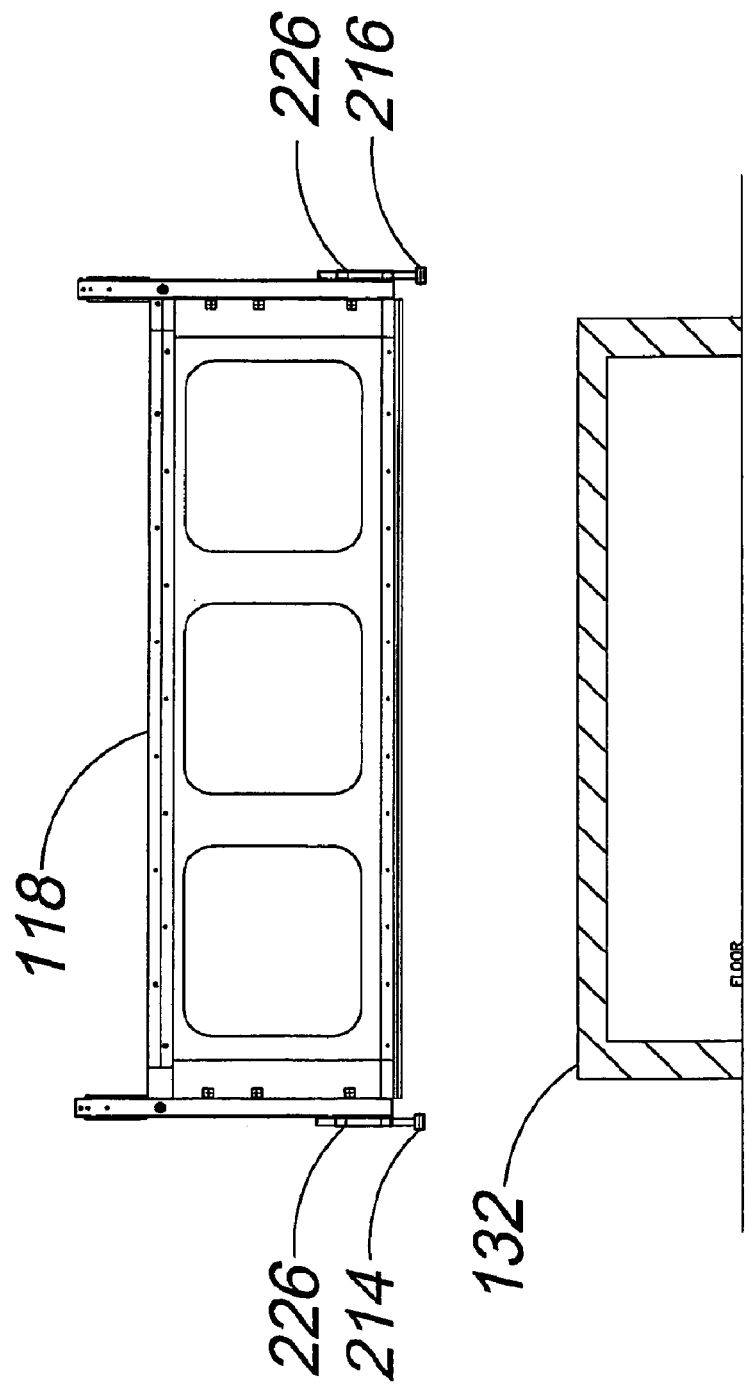
FIG. 6 is a front elevational view of an accumulator backstop taken in the direction of arrows VI-VI in FIG. 5.
Figure 7:
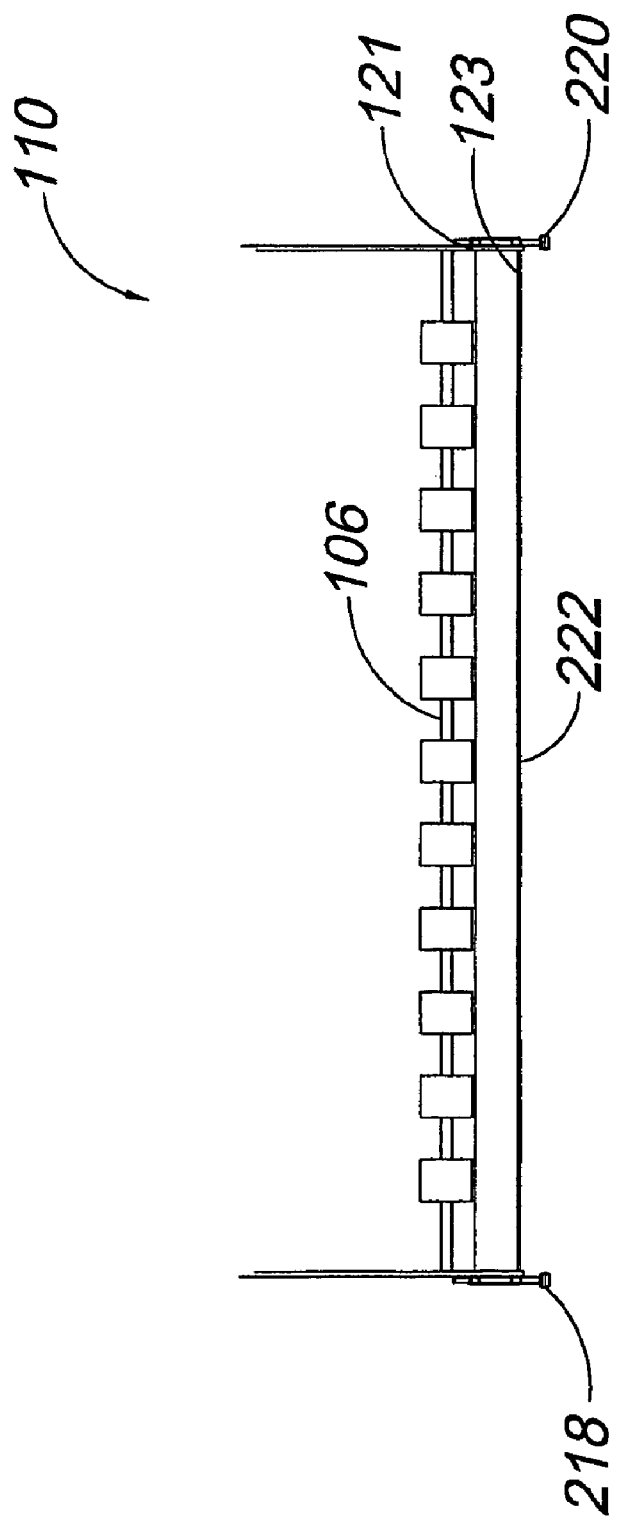
FIG. 7 is a front elevational view of an accumulator face plate taken in the direction of arrows VII-VII in FIG. 5.

Safety controller 212 receives input from various safety sensors on apparatus 200 including a first optical transmitter 214 and optical receiver 216 mounted on accumulator backstop 118 illustrated in FIG. 6 and a second optical transmitter 218 and a second optical receiver 220 mounted on accumulator face place 121 illustrated in FIG. 7. Safety controller 212 also receives input from a contact sensing strip 222, illustrated in FIG. 7, and a non-contact optical area scanner 224 illustrated, for example, in FIG. 5. The optical transmitters and receivers may comprise, for example, safety photoelectric switch system L4000 from SICK, Inc., the safety contact strip may be obtained, for example, from Omron Scientific Technologies, Inc., of Fremont, Calif., and the optical scanner may comprise a Leuze Lumiflex ROTOSCAN RS4-4 available from Leuze Electronic GmbH+Co. KG, of Owen, Germany. Each of these elements and their mutual interaction to protect persons working near stacking apparatus 200 is discussed below. It is further noted that, as used herein, "optical" refers to visible or other electromagnetic radiation—radiation having infrared wavelengths often being used. However, electromagnetic radiation having different wavelengths, or other non-contact sensors, such as ultrasonic sensors, could potentially also be used.

Safety controller 212 is also operatively connected to apparatus controller 202 and can cause apparatus controller 202 to either stop or slow the movement of main conveyor 106. In addition, safety controller 212 is connected to an indicator display 236 that includes green, yellow and red lights to provide visible warning information to users of stacking apparatus 212 and persons working near the machine and optionally, a speaker for generating one or more warning tones as well.

Stacking apparatus 200 is configured so that power is required to lower main conveyor 106; therefore, main conveyor 106 cannot descend when power is disconnected from stacking apparatus 200, and the stacking apparatus is placed into a safe state in the event of power loss. This is accomplished through the use of multiple hydraulic cylinders (not illustrated) with counterbalance valves that as a hydraulic pressure control safety subsystem by providing back pressure in the actuators to eliminate the natural gravitational tendencies of the main conveyor 106 to fall. A pilot operated check valve, which is another hydro-mechanical component, (not illustrated) may be provided to prevent the hydraulic cylinders from retracting in the absence of a command signal from the directional control valve. The pilot operated check valve prevents the deck from falling if one or both of the counterbalance valves fail. A normally closed safety down valve which is held open during normal stacker operation may be provided. Upon a safety system fault, the valve closes thus preventing the deck from descending. During normal operation, this simple safety valve device allows the stacker main conveyor to ascend or descend.

First optical transmitter 216 and first optical receiver 218 are mounted on opposite sides of backstop 118 and spaced from the lower end 119 of backstop 118 and aligned so that an optical beam passes between the transmitter 216 and receiver 218. When this beam is interrupted, a signal is sent to safety controller 212. These sensors are mounted on slide supports 226 so that they will slide out of the way if one of the sensors contacts an object as the accumulator backstop 118 moves. Such contact will move the transmitter 216 and receiver 218 out of alignment and break the beam therebetween so that the transmitter and receiver themselves to not cause injury while the accumulator backstop moves. Second optical transmitter 218 and second optical receiver 220 are mounted on opposite sides of accumulator faceplate 121 and operate in a similar manner, sending a signal to safety controller 212 when an optical beam therebetween is interrupted. Sensing strip 222 also outputs a signal to safety controller 212 when an object contacts that safety strip 222 with a predetermined force.

Non-contact optical scanner 224 is mounted near the base 112 of stacking apparatus 200 and scans an arc of about 190 degrees out to a distance of approximately 15 meters from the scanner. The scanner is programmed to recognize fixed objects within its scanning field and to output various signals when other objects move into the scanning field. Furthermore, the scanning field has multiple zones, and different signals are sent to safety controller 212 depending on the zone in which an object has been detected. The area scanner 224 is generally positioned so that the scanning field is about 20 centimeters from the floor on which the stacking apparatus 200 rests and so that the scanning field extends beneath the main conveyor 106 and out from the opposite, or drive side, of the stacking apparatus.

Figure 8:
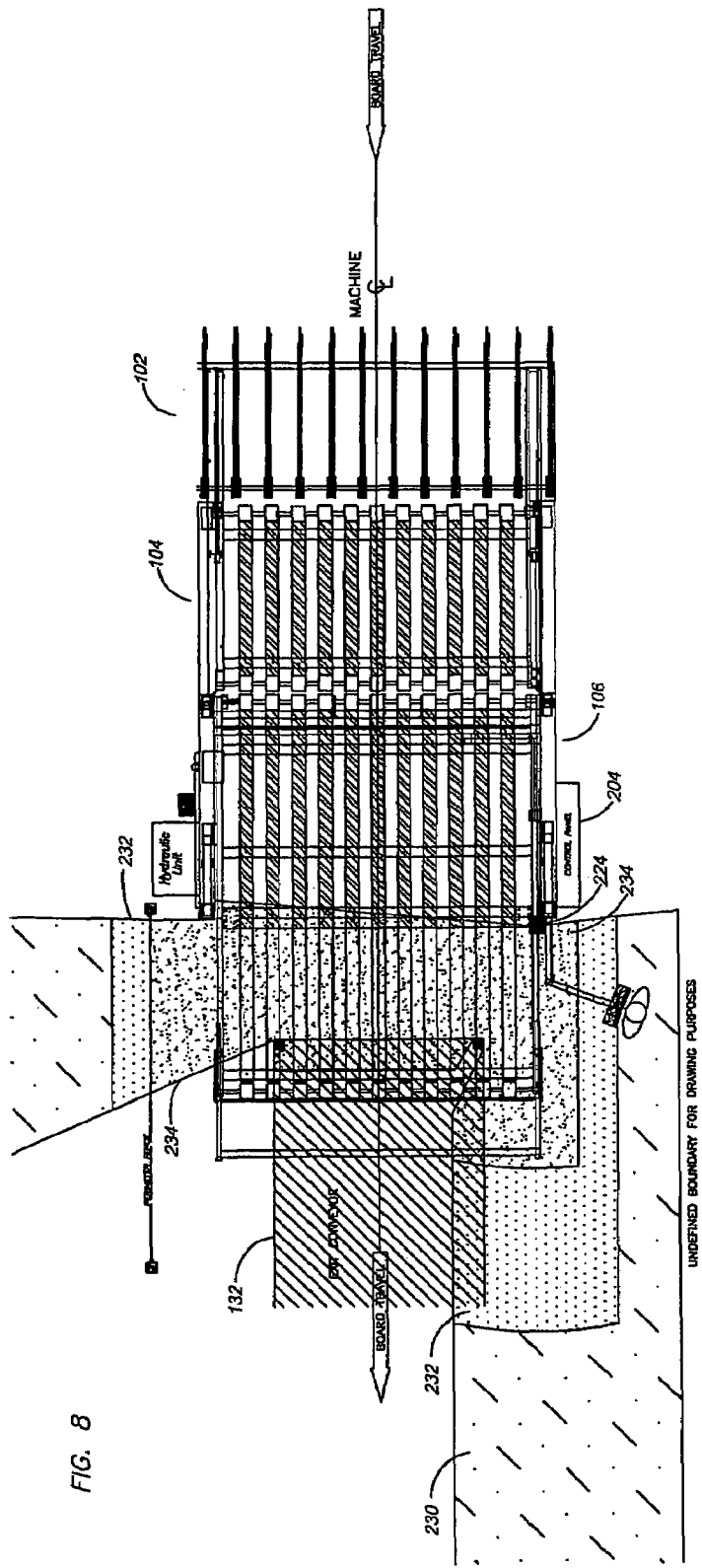
FIG. 8 is a plan view of the apparatus of FIG. 3 schematically showing several defined safety zones.
Figure 9:
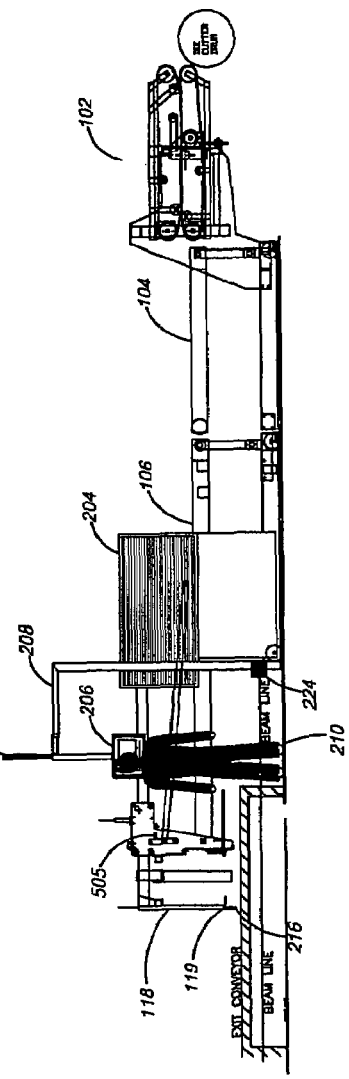
FIG. 9 is an elevational view of the apparatus of FIG. 8 illustrating an operator standing at a control panel of the apparatus.

FIG. 8 illustrates three safety zones recognized by the area scanner 224, a first or safe zone 230, a second or caution zone 232, and a third or danger zone 234. These zones will generally correspond to an industry defined detectable scanning zone, detection zone, and warning zones, respectively, but can be set as desired by the machine owner and/or as required by applicable laws. When safety controller 212 receives a signal indicative of a person or object in the safety zone 230, a green light on indicator 236 is illuminated; when safety controller 212 receives a signal indicative of an object in caution zone 232, a yellow light is illuminated and a warning chime or tone may be sounded. This draws the attention of the operator or other person to the fact that they are in a potentially dangerous situation. When safety controller 212 receives a signal indicative of an object in the danger zone 234, a red light is illuminated and a warning buzzer or siren is sounded. What additional actions are taken with respect to the operation of the stacking apparatus depends on the operating state of the stacking apparatus whether the main conveyor 106 is moving up or down. Various scenarios are discussed below.

With continued reference to FIG. 8, an operator 210 stands at touch screen 206 to operate stacking apparatus 200 when main conveyor 106 is in the down position illustrated in FIG. 3. At this time, blanks are exiting the discharge end 110 of the main conveyor 106 and forming a stack on discharge conveyor 132, and main conveyor 106 is slowly rising to keep discharge end 110 above the top of the growing stack of objects on the discharge conveyor. If the operator steps into the caution zone 232 at this time, the light on the indicator display 236 changes color to yellow and an audible signal may be generated, but the operation of the stacker does not stop. If the operator moves into the danger zone 234, the indicator light changes to red, and safety controller causes the main controller to shut off a control valve (not illustrated) that will prevent the main conveyor 106 from descending. However, operation of the stacking operation still does not stop because, as long as the main conveyor 106 is still rising, it presents a relatively minor threat to the safety of the operator. If the operator thereafter moves back through the caution zone 232 to the safety zone 230, main controller opens the control valve so that the main conveyor 106 can descend when such movement becomes necessary in the operation cycle. In this manner, an automatic reset occurs, and it is not necessary for the operator 210 to manually reset the system after an incursion into the danger zone as was often the case with conventional systems, using light curtain technology, for example.

In a second scenario, operator 210 steps into the caution zone 232 from safety zone 230 when main conveyor 106 is descending. Safety controller 212 then illuminates the yellow light on indicator display 236 and sounds a tone or other warning signal to warn the operator that he is moving into a dangerous position. In addition, the downward movement of the main conveyor 106 is slowed but not stopped. Slowing the main conveyor 106 will make the descent of the main conveyor 106 easier to stop if the operator thereafter moves into the danger zone 234. As in the conventional stacking apparatus discussed above in connection with FIGS. 1 and 2, as the main conveyor 106 descends, articles of material are being caught on catcher elements 120 prior to being deposited on the discharge conveyor 132. The slowing of the descent of the main conveyor therefore does not adversely affect the total output of the stacking apparatus 200. When the operator 210 moves back into the safety zone 230, the green light on the indicator display comes on and the main conveyor 106 resumes descending at its normal speed. If, however, the operator does not return to the safety zone 230 from the caution zone 232 but instead steps into the danger zone 234, safety controller 212 illuminates the red light on display indicator 236, sounds a warning siren or alarm, and stops the downward travel of the main conveyor 106. Because the downward motion of the main conveyor 106 has already slowed, the motion can be stopped completely relatively quickly. Downward movement of the main conveyor continues only after the safety controller 212 senses an object moving from the danger zone 234 to the caution zone 232 and out to the safety zone 230. This sequence of signals, indicating that the operator has left the danger zone, allows the operation of the stacking apparatus to resume without any further action on the part of the operator 210.

As will be appreciated from the drawing figures, area scanner 224 does not scan an area above discharge conveyor 132. This is because the growing stack of objects on the discharge conveyor and the movement of the lower end 119 of backstop 118 and the lower end 123 of accumulator faceplate 121 would appear to the scanner as objects impermissibly in the danger zone 234. By positioning the area scanner 224 at about 20 centimeters off the floor supporting the operator 210 and the stacking apparatus 200, the fixed objects, such as the supports of discharge conveyor 132 can be noted and distinguished from any object that moves into the sensing fields. However, this inability of the area scanner 224 to sense objects on the discharge conveyor leaves open the possibility that an operator or other object on the discharge conveyor 132 could be crushed by either backstop 118 or accumulator faceplate 123. These possibilities are addressed as follows.

If operator 210 steps onto discharge conveyor 132 from danger zone 234, area scanner 224 will no longer see an object in the sensing zones. However, safety controller 212 is programmed to detect a fault condition when an object entering the danger zone 234 via caution zone 232 does not thereafter exit the danger zone 234 through caution zone 232. This fault condition must be manually cleared by an operator before the main conveyor 106 will be allowed to descend. The main conveyor 106 therefore will not descend if an operator is standing on the discharge conveyor 132.

There is a small chance that an object may remain on discharge conveyor 132 in a position below either the accumulator backstop 118 or the accumulator faceplate 121 even after operator 210 exits the danger zone 234 through the caution zone 232. For example, the operator could enter the danger zone 234, place an object (not illustrated) on the discharge conveyor 132, and then exit the danger zone 234 via the caution zone 232. Detecting this proper passage of the operator through the various zones, the main conveyor 106 would be allowed to descend, potentially crushing any object left on the discharge conveyor. Alternately, two operators could enter the danger zone, one operator could step onto the discharge conveyor and the other operator could leave the danger zone 234 via the caution zone 232 thereby potentially resetting the safety controller (which might not adequately distinguish between the two operators). Neither of these scenarios is highly likely, but the significant risk of severe bodily injury or death makes it beneficial to address them. These situations are addressed by the previously discussed first optical transmitter 214 and first optical receiver 216 mounted at the lower end 119 of the accumulator backstop 218 which will detect any object between the sensors (and thus in the path of the moving backstop 118) and send a signal to the safety controller to cause the downward movement of the main conveyor to be halted. After such an emergency stop, an operator would need to reset the safety controller because it would likely require human action to determine the cause of the fault and to correct the fault. During normal operation of the stacking apparatus 200, the discharge conveyor 132 may come between the first optical transmitter 214 and the first optical receiver 216. Controller 202 monitors the position of the main conveyor 106, and safety controller 212 does not trigger a fault condition when the object sensed by the first optical transmitter 214 and first optical receiver 216 is determined to be the discharge conveyor.

The second optical transmitter 218 and the second optical receiver 220 function in a similar manner and cause the downward motion of main conveyor 106 to stop when an object breaks the beam therebetween. Additional protection is provided by contact sensor 222 which also stops the downward movement of the main conveyor when contacted by an object.

It should be understood that the particular configuration of the safety zones is dependent upon the particular device and particular application, and is configured appropriately. The system is freely configurable so that the safety zones can be adjusted according to customer product, machine size, plant layout, and any other relevant factors. Furthermore, it should be understood that the particular zone pair described above is configured with the recognition that the main conveyor presents less potential bodily harm to the operator while it is moving upward.

As mentioned above, the scanning zones are configured depending on the operational state of the stacker. In addition to the main conveyor moving up, the various states include the main conveyor moving down, the main conveyor being stationary. Other operational states, such as the main conveyor being in maintenance mode, may also be recognized.

Another mode of stacker operation is lock-out mode or maintenance mode. In this mode, a stacker may be placed in the full upward position, FIG. 3, and lock-out pins (not illustrated) may be placed in the stacker to engage the main conveyor and mechanically prevent the main conveyor 106 from descending. This is considered a safe maintenance or zero energy state. At this point, the main conveyor presents negligible bodily harm to the operator if the machine is at rest and not under power. Thus, the detectable scanner area and the warning scanner area are configured appropriately, and the safety system sounds appropriate warnings.

Dual channel safety rated e-stop circuits that are two channel safety rated with multiple operators may be strategically and ergonomically located on the machine and connected to the safety controller 212. The safety rated e-stop controls, which are commercially available, are designed to be control reliable in accord with EN954-1. In addition, each of the safety sensors discussed herein, namely, the first and second optical transmitters, 214, 218, the first and second optical receivers 216, 220, the safety contact strip 222, the scanner 223 and the safety controller 224 are control reliable. Control reliability refers to the capability of the machine control system, the safeguarding, other control components and related interfacing to achieve a safe state in the event of a single failure within their safety related functions. In this manner, a high degree of safety can be provided to operators of stacking apparatus 200 and persons and objects in the vicinity of the apparatus. Redundancy is enhanced by the use of a control reliable safety controller separate from the less reliable machine controller, further reducing the possibility of injury. The safety system does not prevent the use of more traditional warning and safety mechanisms, such as appropriate signage and perimeter protection using hard guarding such as gates and/or fences. However, multiple safety sensors provide redundancy and greatly decrease the possibility of injury to persons working near an operating machine.

While the present invention has been shown and described with reference to certain exemplary embodiments thereof, it will be understood by those skilled in the art that various additions and/or changes in form and details may be made therein without departing from the spirit and scope of the invention. It is intended that all such additions and changes form a part of the present invention to the extent they fall within the scope of the several claims appended hereto.

What is claimed is:

1. A stacking apparatus for moving items from an upstream location to a downstream location comprising:
    a base;

a main conveyor pivotably supported on the base and having an intake end and a discharge end, said main conveyor discharge end being pivotable between a first, lowered, position and a second, raised, position, said first and second positions defining first and second ends of a main conveyor travel path;

an accumulator section downstream of the main conveyor discharge end for receiving the items from the main conveyor, said accumulator section including a support for supporting a stack of items fed to the accumulator section by the main conveyor;

at least one optical sensor detecting the presence of an object in the main conveyor travel path; and at least one controller operatively connected to said main conveyor and said at least one optical sensor, said at least one controller receiving signals from said at least one optical sensor and controlling said main conveyor to allow, when said main conveyor is rising, continued upward movement of said main conveyor when the object is detected by said at least one sensor and when said main conveyor is lowering, to stop continued downward movement of said main conveyor when the object is detected by said at least one sensor.

2. The stacking apparatus of claim 1 wherein said accumulator section comprises a faceplate at the discharge end of the main conveyor and a backstop downstream of the discharge end of the main conveyor.

3. The stacking apparatus of claim 2 wherein said at least one optical sensor comprises an optical transmitter and an optical receiver mounted on said backstop.

4. The stacking apparatus of claim 2 wherein said at least one optical sensor comprises an optical transmitter and an optical receiver mounted near an end of said accumulator faceplate.

5. The stacking apparatus of claim 2 wherein said at least one optical sensor comprises an optical area scanner having a scanning zone extending beneath said main conveyor said optical area sensor being fixed to a stationary frame member of said stacking apparatus.

6. The stacking apparatus of claim 2 wherein said at least one optical sensor comprises a first optical transmitter and receiver mounted on said backstop, a second optical transmitter and receiver mounted near an end of said accumulator faceplate and an optical scanner having a scanning zone extending beneath said main conveyor.

7. The stacking apparatus of claim 6 wherein said at least one controller comprises a machine controller controlling the operation of said main conveyor and a safety controller operatively connected to said machine controller and receiving inputs from said at least one optical sensor.

8. The stacking apparatus of claim 2 wherein said at least one controller comprises a machine controller controlling the operation of said main conveyor and a safety controller operatively connected to said machine controller and receiving inputs from said at least one optical sensor, wherein signals from said safety controller produce a first set of responses when said main conveyor is moving from said raised position to said lowered position and a second, different, set of responses when said main conveyor is not moving from said raised position to said lowered position.

9. The stacking apparatus of claim 2 wherein:
said at least one controller comprises a safety controller operatively connected to said at least one optical sensor and a machine controller operatively connected to said main conveyor;
said at least one optical sensor comprises an optical scanner having a scanning field extending between said main conveyor and a support supporting said stacking apparatus, said scanning field having first and second zones; and
said main controller causes movement of said main conveyor between said raised position and said lowered position to slow when an object is detected in said first zone and causes movement of said main conveyor between said raised position and said lowered position to stop when an object is detected in said second zone.

10. A method of operating a stacking apparatus including:
a base; and
a main conveyor pivotably supported on the base and having an intake end and a discharge end, the main conveyor discharge end being pivotable between a first, lowered, position and a second, raised, position, the first and second positions defining first and second ends of a main conveyor travel path;
the method comprising the steps of:
providing at least one optical sensor detecting the presence of an object in a first zone in and within a first distance of the main conveyor travel path and in a second zone outside the first zone;
allowing movement of the main conveyor between the lowered position and the raised position when the optical sensor detects an object in the first zone; and
stopping the movement of the main conveyor between the raised position and the lowered position when the optical sensor detects an object in the first zone.

11. The method of claim 10 including the additional step of slowing the movement of the main conveyor between the raised position and the lowered position when the at least one optical sensor senses an object in the second zone.

12. The method of claim 10 including the steps of:
when the main conveyor is moving from the lowered position to the raised position and an object is detected in the first zone, shifting the stacking apparatus into a state wherein the main conveyor cannot move toward the lowered position.

13. The method of claim 12 including the additional step of automatically shifting the stacking apparatus into a state wherein the main conveyor can move toward the lowered position when no object is detected in the first zone and an object is detected in the second zone.

14. The method of claim 10 including the additional steps of, after allowing movement of the main conveyor between the lowered position and the raised position when the optical sensor detects an object in the first zone, automatically allowing movement of the main conveyor between the raised position and the lowered position when no object is detected in the first zone.

15. The method of claim 10 including the additional step of producing a first warning signal when the at least one optical sensor detects an object in the first zone and producing a second warning when the at least one optical sensor detects an object in the second zone.

16. A rotary die cut stacker comprising:
a base;
a layboy receiving die cut blanks from a rotary die cutter;
a main conveyor pivotably supported on the base and having an intake end and a discharge end, said main conveyor discharge end being pivotable between a first, lowered, position and a second, raised, position, said first and second positions defining first and second ends of a main conveyor travel path;
an accumulator section downstream of the main conveyor discharge end for receiving the items from the main conveyor, said accumulator section including a support for supporting a stack of items fed to the accumulator section by the main conveyor;

at least one optical sensor detecting the presence of an object in the main conveyor travel path; and at least one controller operatively connected to said main conveyor and said optical sensor, said at least one controller receiving signals from said optical sensor and controlling said main conveyor to allow, when said main conveyor is rising, continued upward movement of said main conveyor when the object is detected by said at least one sensor and when said main conveyor is lowering, to stop continued downward movement of said main conveyor when the object is detected by said at least one sensor.

17. The rotary die cut stacker of claim 16 wherein said at least one controller comprises a machine controller controlling the operation of said main conveyor and a safety controller operatively connected to said machine controller and receiving inputs from said at least one optical sensor, wherein signals from said safety controller produce a first set of responses when said main conveyor is moving from said raised position to said lowered position and a second, different, set of responses when said main conveyor is not moving from said raised position to said lowered position.

18. The rotary die cut stacker of claim 16 wherein:

said main controller comprises a safety controller operatively connected to said at least one optical sensor and a machine controller operatively connected to said main conveyor;

said at least one optical sensor comprises an optical area scanner having a scanning field extending between said main conveyor and a support supporting said main conveyor, said scanning field having first and second zones; and said main controller causing movement of said main conveyor between said raised position and said lowered position to slow when an object is detected in said first zone and causes movement of said main conveyor between said raised position and said lowered position to stop when an object is detected in said second zone.

19. A safety system for a stacking apparatus that moves items from an upstream location to a downstream location, the safety system comprising:

at least one optical area scanner detecting the presence of an object in a main conveyor travel path, the main conveyor being pivotably supported on a base and having an intake end and a discharge end, said main conveyor discharge end being pivotable between a first, lowered, position and a second, raised, position, said first and second positions defining first and second ends of a main conveyor travel path; and at least one controller operatively connected to said main conveyor and said optical area scanner, said at least one controller receiving signals from said optical area scanner and controlling said main conveyor based on said signals and based on a direction of movement of said main conveyor.

20. The stacking apparatus of claim 1 further including a contact sensing strip mounted on said accumulator faceplate and operatively connected to said at least one controller.

* * * * *